United States Patent [19]

Yoon

[11] 4,102,477
[45] Jul. 25, 1978

[54] SUGAR DISPENSING APPARATUS

[76] Inventor: Jong Un Yoon, 83 Elmvalz Ave., Brampton, Ontario, Canada

[21] Appl. No.: 718,541

[22] Filed: Aug. 30, 1976

[51] Int. Cl.² .............................................. G01F 11/28
[52] U.S. Cl. .................................... 222/438; 222/449; 222/452
[58] Field of Search ............... 222/425, 434, 435, 438, 222/439, 444, 448–452, 361, 362, 367, 370, 454, 517, 556, 305

[56] References Cited

U.S. PATENT DOCUMENTS

| | | | |
|---|---|---|---|
| 1,401,412 | 12/1921 | Klein | 222/449 |
| 2,059,135 | 10/1936 | Moe | 222/452 |
| 2,748,995 | 6/1956 | Hightower et al. | 222/449 |

FOREIGN PATENT DOCUMENTS 33,666   5/1905   Switzerland .......................... 222/434

Primary Examiner—Robert B. Reeves
Assistant Examiner—H. Grant Skaggs

[57] ABSTRACT

A device for dispensing a free-flowing particulate substance comprises a chamber having a normally open inlet and a normally closed outlet. The substance is dispensed by substantially simultaneously opening the outlet of the chamber and closing the inlet of the chamber. A wall of the chamber may be moveable to set positions relative to the remaining stationary walls of the chamber to vary the volume of the chamber and thereby dispense various desired quantities of substance.

3 Claims, 7 Drawing Figures

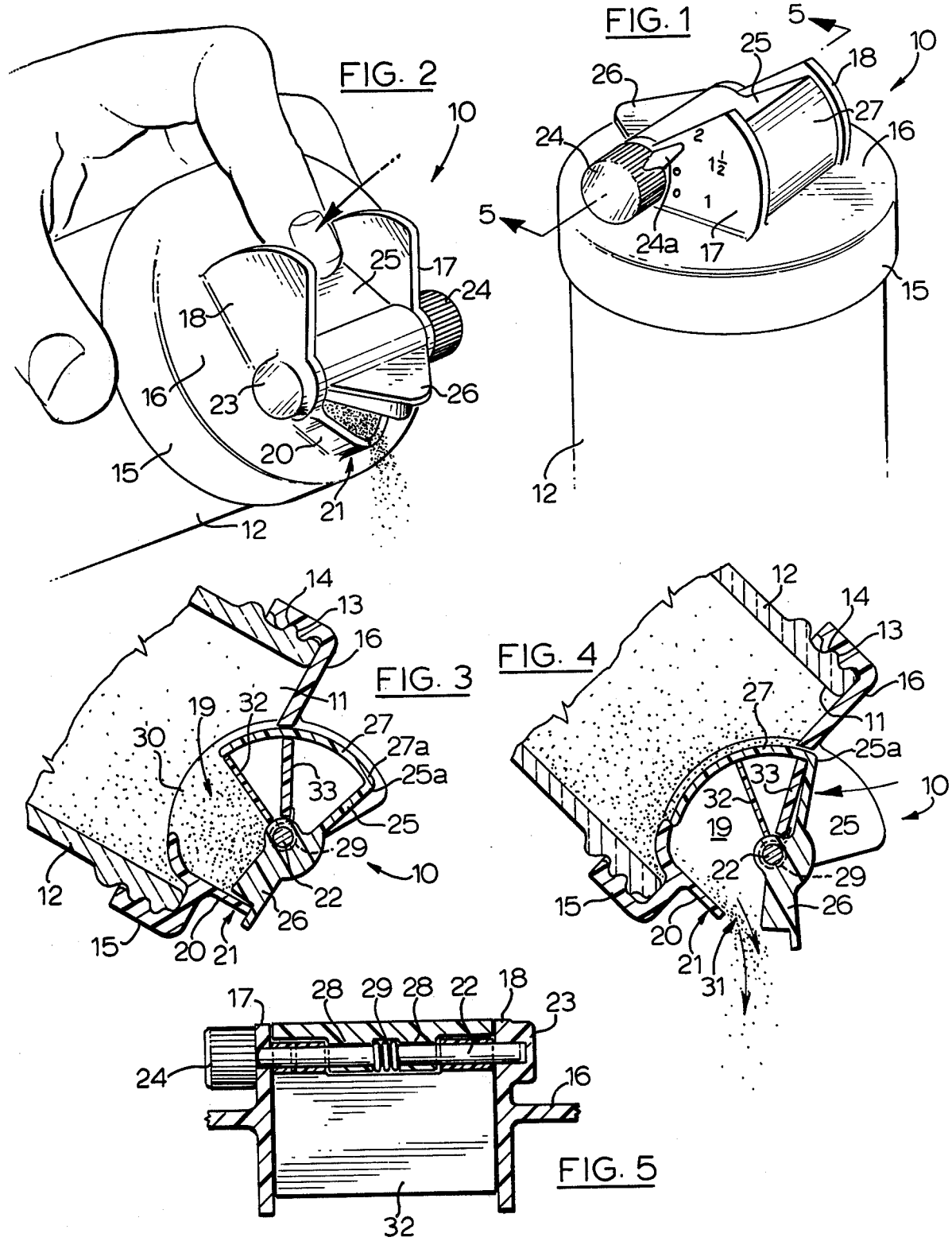

SUGAR DISPENSING APPARATUS

FIELD OF THE INVENTION

This invention relates to a dispensing device for use with containers and the like for dispensing a measured quantity of a particulate substance contained in the container and to containers having such devices.

BACKGROUND OF THE INVENTION

A dispensing device which is found in most restaurants is a sugar dispenser. Usually this type of sugar dispenser does not measure a quantity of sugar and therefore require the use of a spoon in order to measure the desired quantity of sugar. As so often happens, an overflow of sugar occurs while attempting to measure the quantity of sugar, thus creating the situation where the user gets too much sugar and is not satisfied as well as a wastage of sugar which in todays market is a very expensive commodity.

At times it is also desirable to obtain a fairly accurate measurement of the quantity of a particulate substance to be dispensed, such as sugar, without the use of other measuring devices which may not be readily available.

SUMMARY OF THE INVENTION

It is therefore an object of the present invention to provide a device for use with containers for dispensing a measured quantity of free-flowing particulate substances contained in the container.

It is also a further object of the invention to provide containers having a device for dispensing measured quantity of free-flowing particulate substances contained in the containers.

It is also a further object of the invention to provide a dispensing device for dispensing measured quantity of free-flowing particulate substances in which the quantity being measured and dispensed may be varied.

According to the invention there is provided a dispensing device for attachment to containers and the like. Particulate substances such as sugar contained in the container pass into a chamber of predetermined volume upon proper tilting of the container. The measured quantity of sugar may then be released from the chamber while at the same time the sugar remaining in the container is prevented from flowing into the chamber.

Further, according to the invention there is provided a cap or top for containers which may be threadably connected to containers having corresponding threaded openings. On the cap, a dispensing device is provided having two spaced apart side walls projecting above and below the cap. A front wall is provided which extends above and below the cap. A pin is located between the spaced apart side walls and journalled therethrough. A moveable back wall is provided which is fixedly secured along its top edge to the pin along the pin's longitudinal axis for rotational movement in relation to the rotation of the pin about its longitudinal axis. The front wall, back wall and side wall define a chamber having a variable volume as adjusted by the back wall thereby the desired quantity of particulate substance to be dispensed is measured. The chamber has an inlet and an outlet, thus allowing the substance to enter and to exit the chamber.

A cover is pivotally connected to the pin to provide a closure for the outlet of the chamber. Integral with the cover, and also pivotally connected to the pin is a lever arm. The lever arm and cover may be spring-biased towards the outlet closed position. At the end of the lever arm distal from the pin is an arcuate shutter. The shutter is arranged such that upon movement of the lever arm about the pin, the shutter closes the inlet of the chamber. By depressing the lever arm, the shutter is moved towards the inlet closed position while the cover is moved towards the outlet open position to allow the sugar contained in the chamber to be dispensed.

The back wall and the pin are arranged such that the pin may be rotated about its longitudinal axis to a number of positions which in turn swings the back wall through an arc to various positions thus varying the chamber volume.

A plate may be located between the back wall and the lever arm and contacting the inside surfaces of the side walls of the chamber to provide a seal to prevent the substances contained in the container from flowing out behind the back wall of the chamber.

It is understood that containers having devices as described above integrally molded therewith also comes within the spirit of the invention and the scope of the appended claims.

The lever arm, cover and arcuate shutter may be an integrally molded unit, the unit being biased to the outlet closed position. The arrangement is such that by depressing the lever arm against the bias of the spring, the inlet is closed and the outlet is open thus allowing the substance contained in the chamber to flow out. One end of the pin may be provided with a dial which may have various settings to set the back wall in various positions thereby varying the chamber volume.

BRIEF DESCRIPTION OF THE DRAWINGS

These and other objects, advantages, and features of the invention will become apparent in the following description of the drawings wherein:

FIG. 1 is a perspective view of the dispensing device showing the dial setting at 2.

FIG. 2 is a perspective view of the dispensing device having its lever arm depressed which in turn opens the chamber outlet.

FIG. 3 is a cross-sectional view showing the chamber filling with substance with the cover closing the outlet and the arcuate shutter withdrawn to clear the inlet.

FIG. 4 is a cross-sectional view similar to FIG. 3 with the lever arm depressed thus closing off the chamber inlet and opening the chamber outlet to allow a free-flowing particulate substance in the chamber to flow out.

FIG. 5 is a cross-sectional view taken along the line 5—5 of FIG. 1 to show the pin, the spring, the back wall which is fixedly secured to the pin and the dial.

DETAILED DESCRIPTION OF THE PREFERRED EMBODIMENTS

Figure 6:
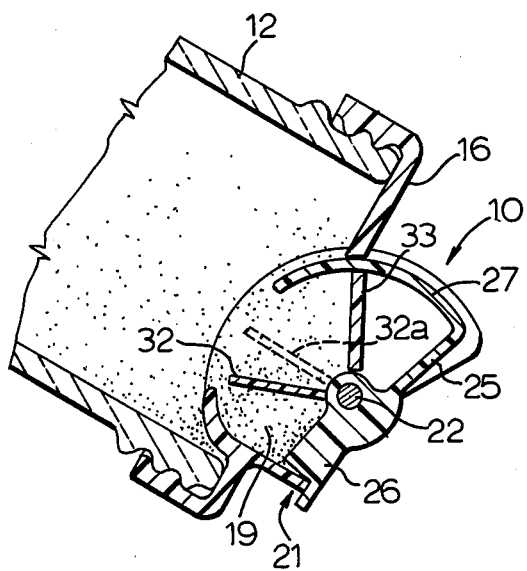
FIG. 6 is a cross-sectional view similar to FIGS. 3 and 4 showing the back wall in a position wherein the chamber has the smallest volume.

With reference to the drawings, there is shown a preferred embodiment of the invention for dispensing measured quantities of a free-flowing particulate substance such as sugar. The device is generally designated at 10 as shown in FIG. 1. The device is threadably connected to opening 11 of container 12 by means of threads 13 of dispensing device 10 and threads 14 of container 12 as shown in FIG. 2. Threads 13 are located on the inside surface of skirt 15 which depends from and is integral with the top 16.

Two spaced apart side walls 17 and 18 protrude above and below top 16. The portion of side walls 17 and 18 which extend below top 16 provide the side walls for the chamber 19 as shown in FIG. 3.

A front wall 20 also projects above and below the top 16. The portion of the front wall 20 which projects below top 16 is the front wall of chamber 19. Also, the portion of the front wall 20 projecting above the top 16 and designated as 21 is the spout of the device.

A pin 22 is disposed between the side walls 17 and 18 and journalled therethrough. The pin 22 at one end is in a blind bearing 23 which prevents axial movement of pin 22 in the direction of the blind bearing. The opposite end of pin 22 protrudes beyond side wall 17 and has a knob 24 with a dial setting indicator 24a whose function will hereinafter be described in further detail. The pin 22 is fixedly secured to knob 24 and the pin 22 is free to rotate about its longitudinal axis in the bearings provided in side walls 17 and 18.

A lever arm 25 is integral with cover 26 and arcuate shutter 27 as shown in FIG. 3. The lever arm 25 and arcuate shutter 27 are disposed between and slidably contact the inside surfaces of the side walls 17 and 18. At the juncture of lever arm 25 and cover 26, there is provided a bearing 28 through which pin 22 is journalled. The cover 26 and lever arm 25 pivot about pin 22 which in turn causes the arcute shutter 27 to rotate about pin 22 because the end 25a of the lever arm 25 is integrally molded with an edge 27a of the arcuate shutter.

A back wall 32 is fixedly secured to pin 22 along one edge thereof as shown more clearly in FIG. 5. The back wall 32 constitutes the back wall of chamber 19. Thus, the inside surfaces of front wall 20, side walls 17 and 18 and back wall 32 define the chamber 19. The lower edges of the front wall 20, side walls 17 and 18 and back wall 32 projecting below top 16 define the inlet 30 for chamber 19. The outlet 31 is defined by the upper edges of the same walls which project above the top 16.

Spring 29 is coiled about pin 22 where a free end of the spring is so disposed that the cover 26 is yieldingly biased in the outlet closed position.

The cover 26 and lever arm 25 are free to rotate about pin 22. In order to close the inlet 30 of the chamber 19 and to open the outlet 31 to allow the sugar contained in chamber 19 to be released, the lever arm 25 is depressed against the bias of spring 29 whereby the arcuate shutter 27 pivots about the longitudinal axis of pin 22 to move into a position which closes the inlet 30 and substantially simultaneously the cover 26 pivots about the same axis to move into a position which opens the outlet 31 of the chamber 19. Such final positions for the arcuate shutter 27 and the cover 26 are shown in FIG. 4. By releasing the lever arm 25, the spring 29 causes the cover 26 to close the outlet 31 and the arcuate shutter 27 to withdraw away from the inlet 30.

A sealing plate 33 is located between the back wall 32 and lever arm 25 and contacts the inside surfaces of sides 17 and 18 and also contacts the inside surface of arcuate shutter 27 to prevent sugar from leaking out behind the back wall 32.

Since back wall 32 is fixedly secured to pin 22 which in turn is fixedly secured to knob 24, the turning of knob 24 causes the back wall 32 to rotate about pin 22 to increase or decrease the volume of chamber 19. This is more clearly illustrated in FIGS. 6 and 7. Any number of settings for knob 24 may be provided and as shown in FIG. 1, three settings are illustrated where the number 1 indicates 1 teaspoon, number 1 ½ indicates 1½ teaspoons, and number 2 indicates 2 teaspoons to be dispensed. The position of the back wall 32 as shown in FIG. 3 is for dispensing 2 teaspoons of sugar. The position shown in broken lines 32a of FIG. 6 is for dispensing 1½ teaspoons and the other position for back wall 32 which is shown in FIG. 6 is for 1 teaspoon.

Figure 7:
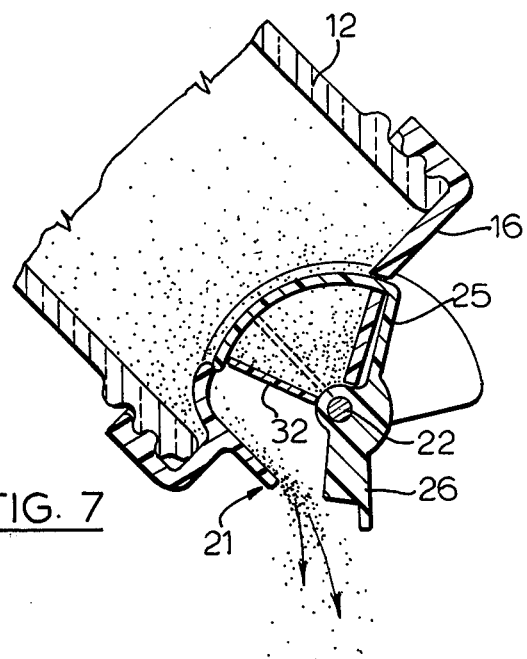
FIG. 7 is a cross-sectional view similar to FIG. 4 showing the operation of the lever arm, arcuate shutter and outlet cover during the release of the substance from the chamber when the back wall is in the setting shown in FIG. 6.

In order to use the dispensing device, the user tilts the container in the direction of the device causing chamber 19 to be filled with sugar or some other type of free-flowing particulate substance. The user then depresses lever arm 25, moving the arcuate shutter to close off the inlet 30 to prevent further amount of sugar from flowing into the chamber while at the same time the cover 26 opens the outlet 31 to allow the sugar contained in chamber 19 to be released. The dispensing of sugar is shown in FIGS. 4 and 7.

It can be seen by those skilled in the art that the device as shown can be integrally molded with any type of container and may be useful in measuring and dispensing a variety of substances and not just sugar.

It can also be seen by those skilled in the art that other variations may be made to adapt the dispensing device to be fitted onto any container.

Although various embodiments of the invention have been described herein in detail, it is understood by those skilled in the art that variations may be made thereto without departing from the spirit of the invention or the scope of the appended claims.

The embodiments of the invention in which an exclusive property or priviledge is claimed are defined as follows:

1. A device for use with a container for dispensing measured quantities of free-flowing particulate substance from a container comprising a chamber having an inlet and an outlet, two spaced-apart side walls, a front wall and a back wall; the top edges of said walls defining said outlet and the bottom edges of said walls defining said inlet; said front wall at the outlet forming a spout for said device; a cover for said outlet and a moveable arcuate shutter for said inlet; a lever arm being integral with said cover and said arcuate shutter; the juncture of said cover and said lever arm being pivotally connected to a pin disposed between and journalled through said side walls adjacent said outlet whereby said lever arm, said cover and said arcuate shutter pivot about a common axis; said cover and said arcuate shutter being spring biased in the outlet closed and inlet open position, said lever arm being depressible against the spring bias such that said lever arm pivots about the longitudinal axis of said pin to move said cover away from said outlet of said chamber and to move said arcuate shutter over said inlet of said chamber to permit a free-flowing particulate substance to flow out of said chamber.

2. A device as claimed in claim 1 wherein said chamber is adjustable.

3. A device as claimed in claim 2 wherein said adjustable chamber comprises said back wall being fixedly secured along its top edge to said pin along its length, said pin being free to rotate about its longitudinal axis pivots said back wall about said pin to move said back wall within said chamber and thereby adjust the volume of said chamber; and a dial indicator connected to said pin for setting said back wall in desired radial positions relative to said longitudinal axis to set the desired volume in said chamber.

* * * * *